INVENTORS
NORMAN C. SCHUTT
FLOYD W. FLYNN
JOHN LOUIS BJELLAND
BY
Morgan, Finnegan, Durham & Pine
ATTORNEYS.

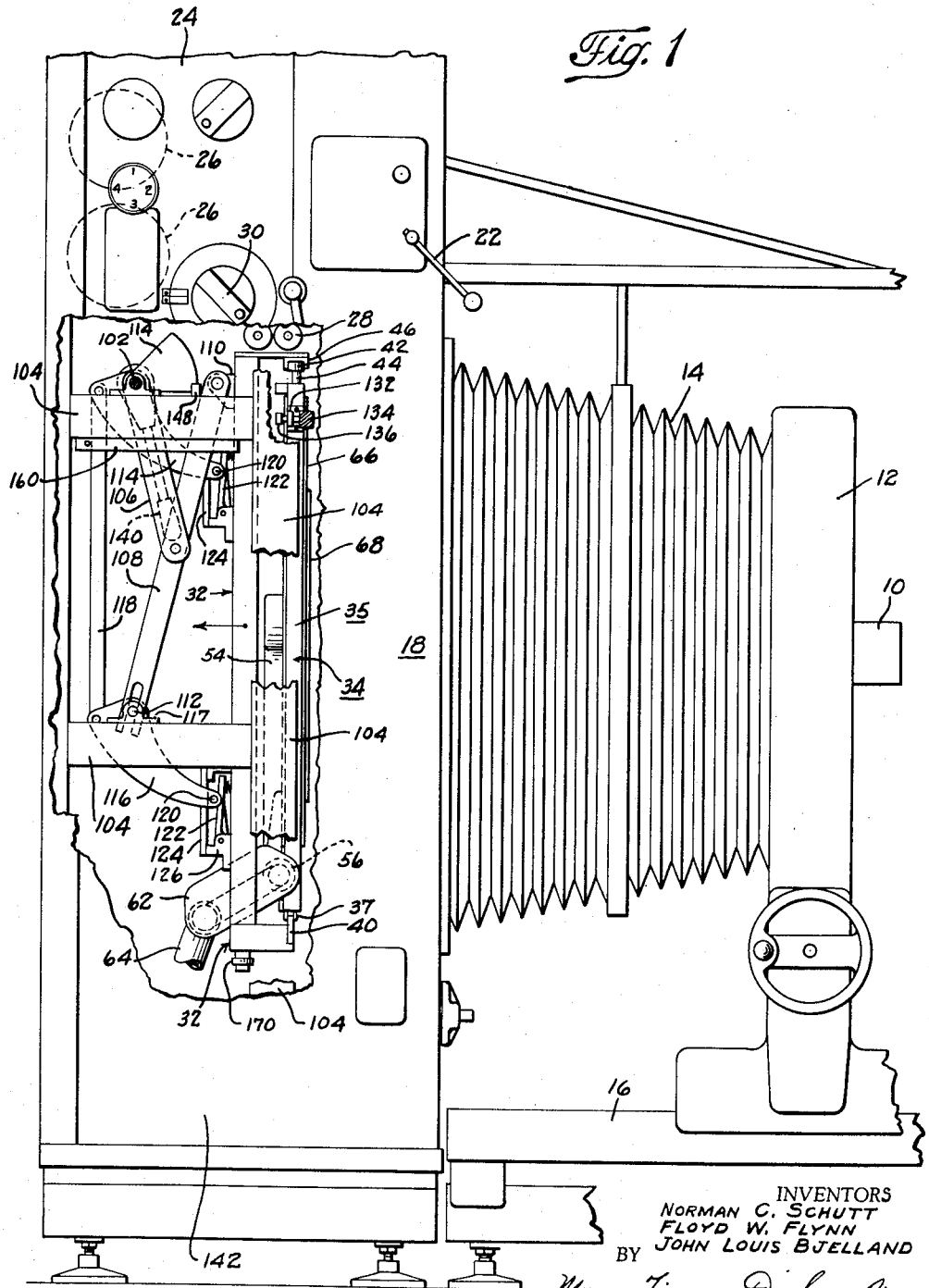

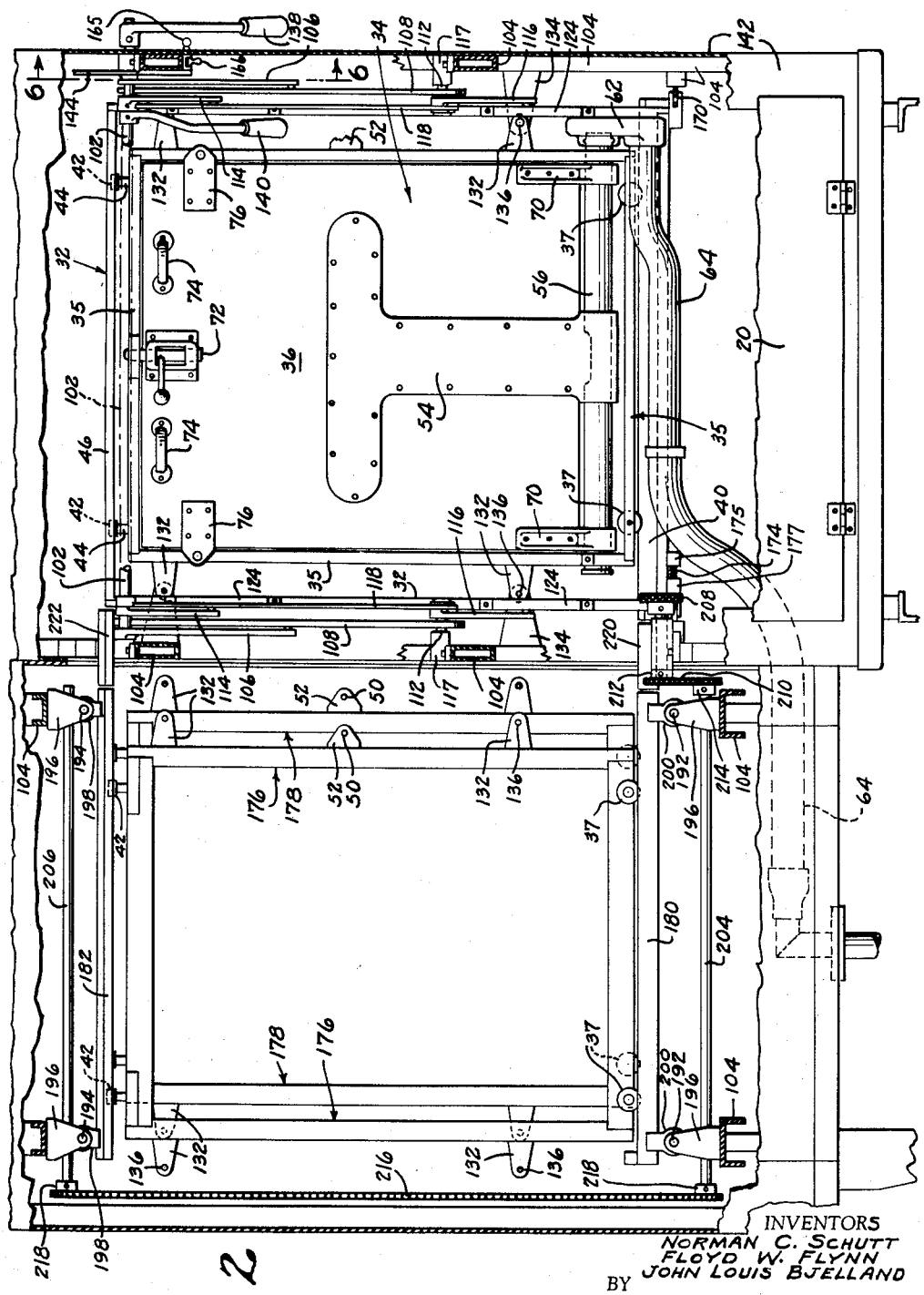

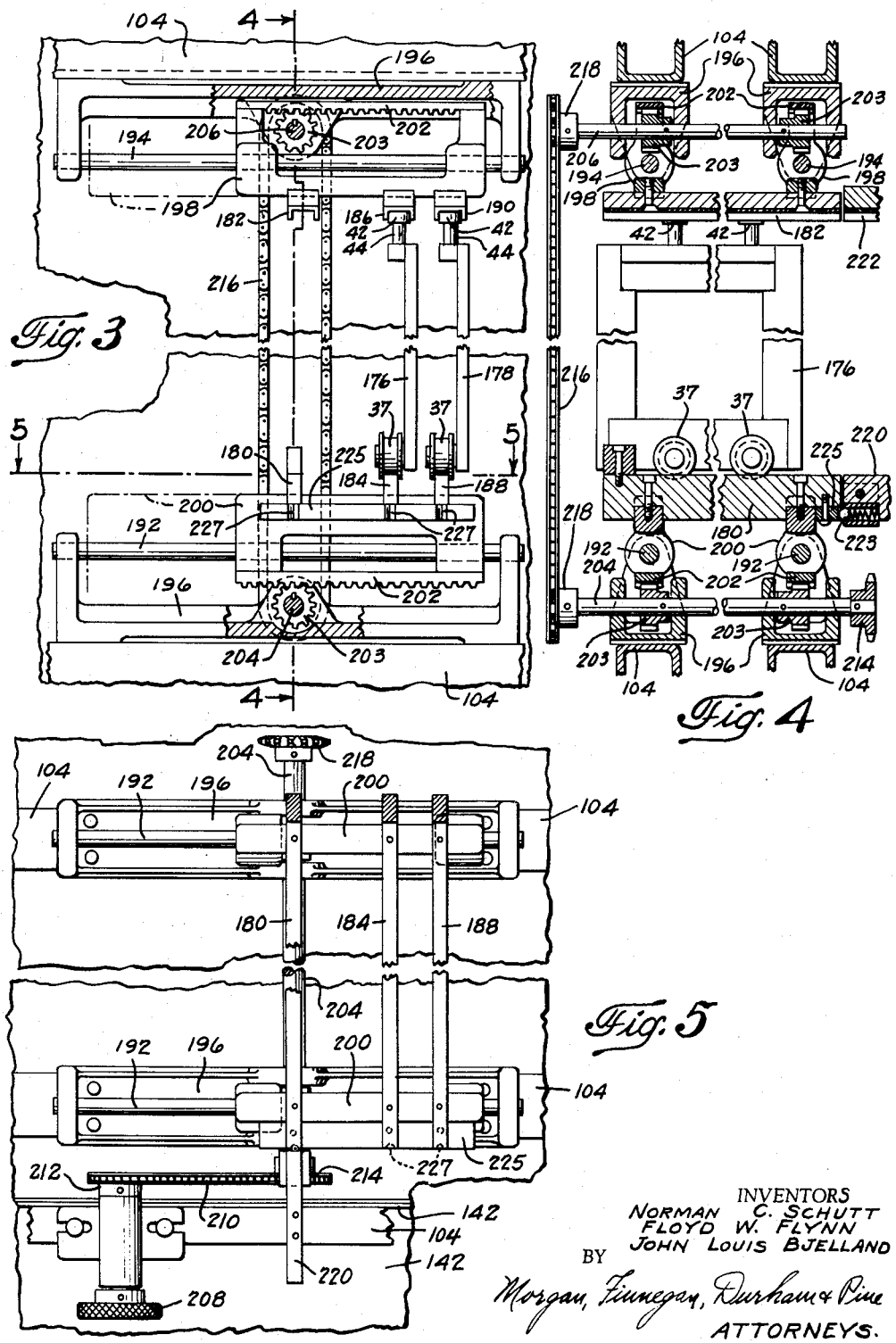

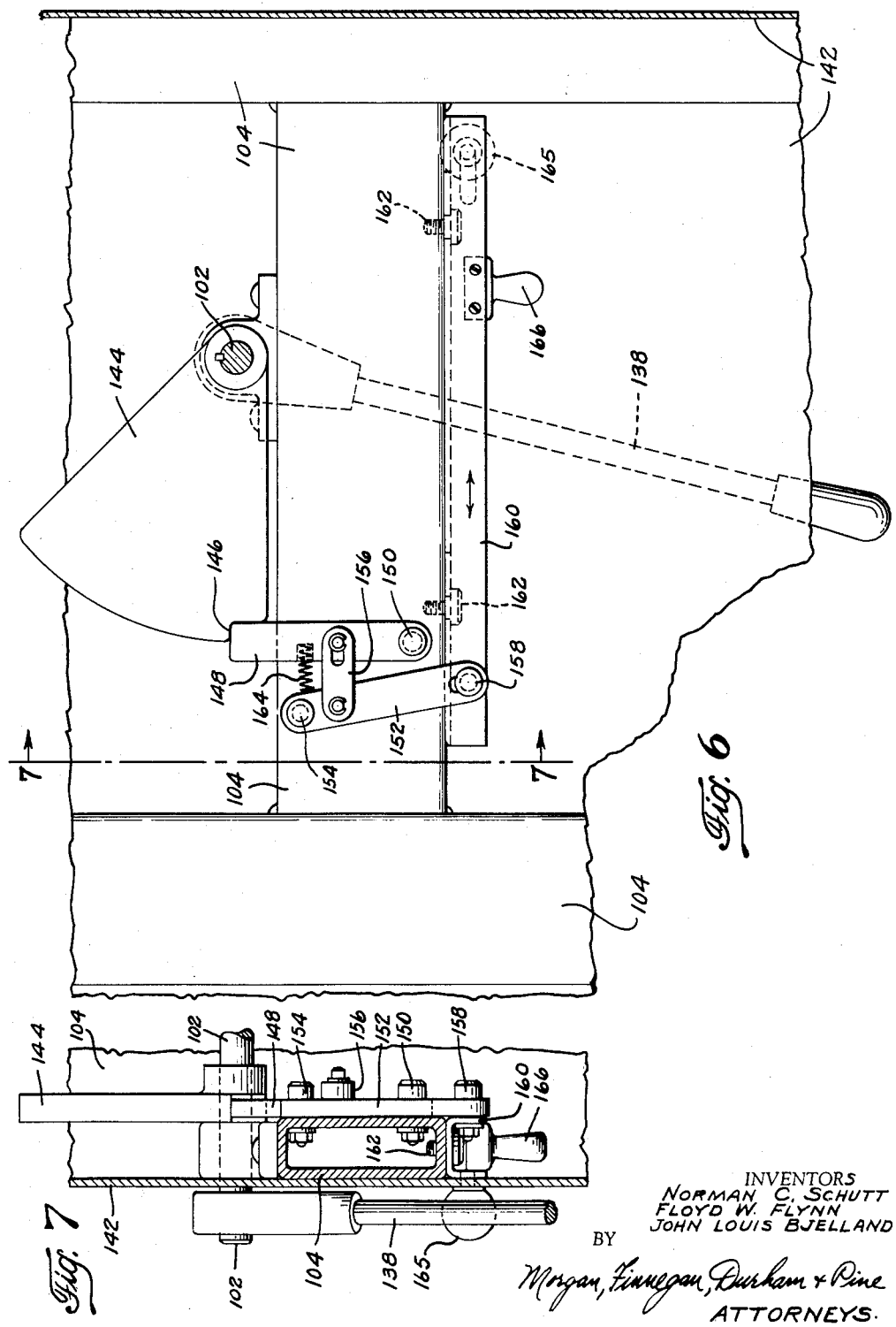

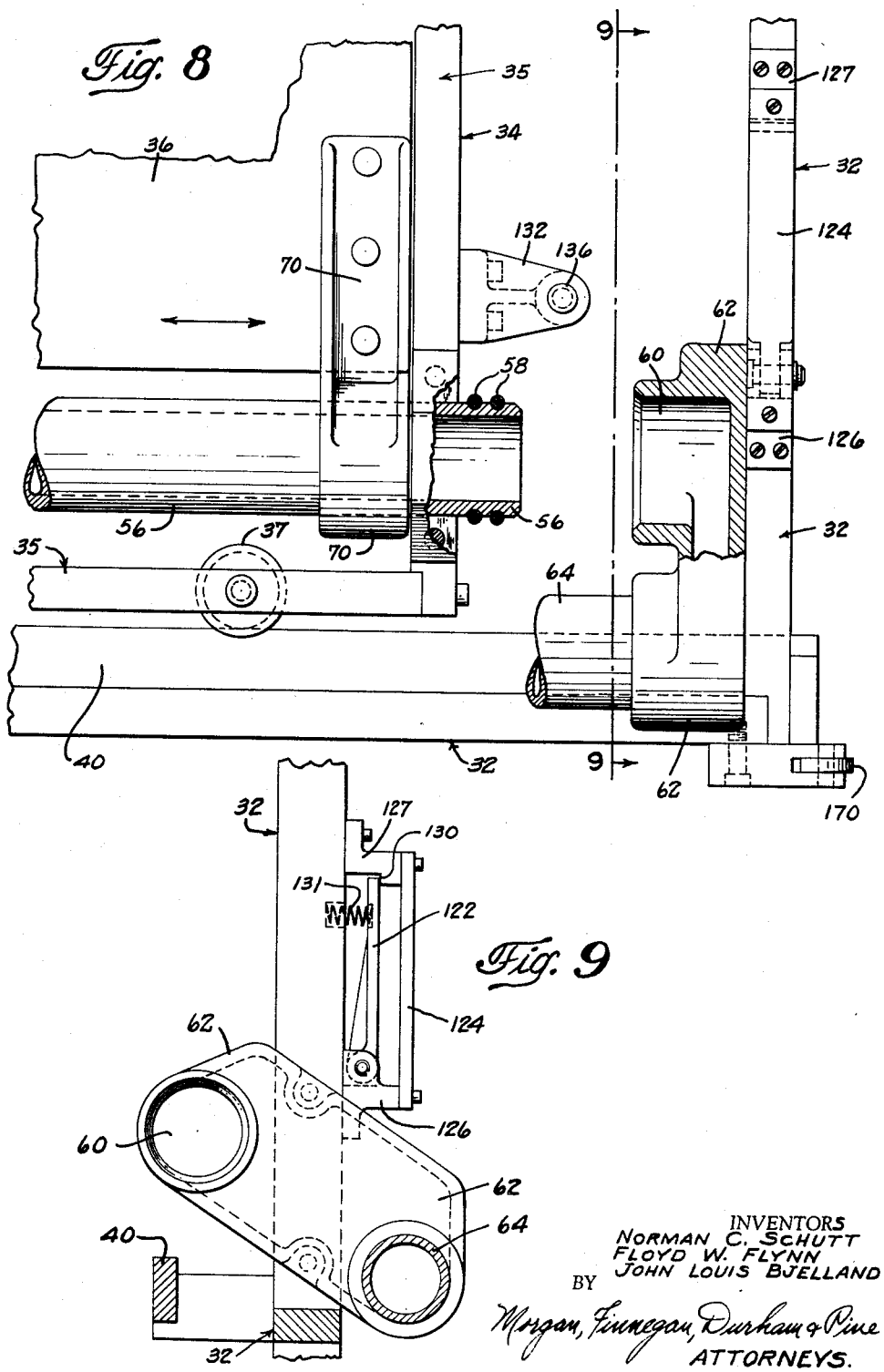

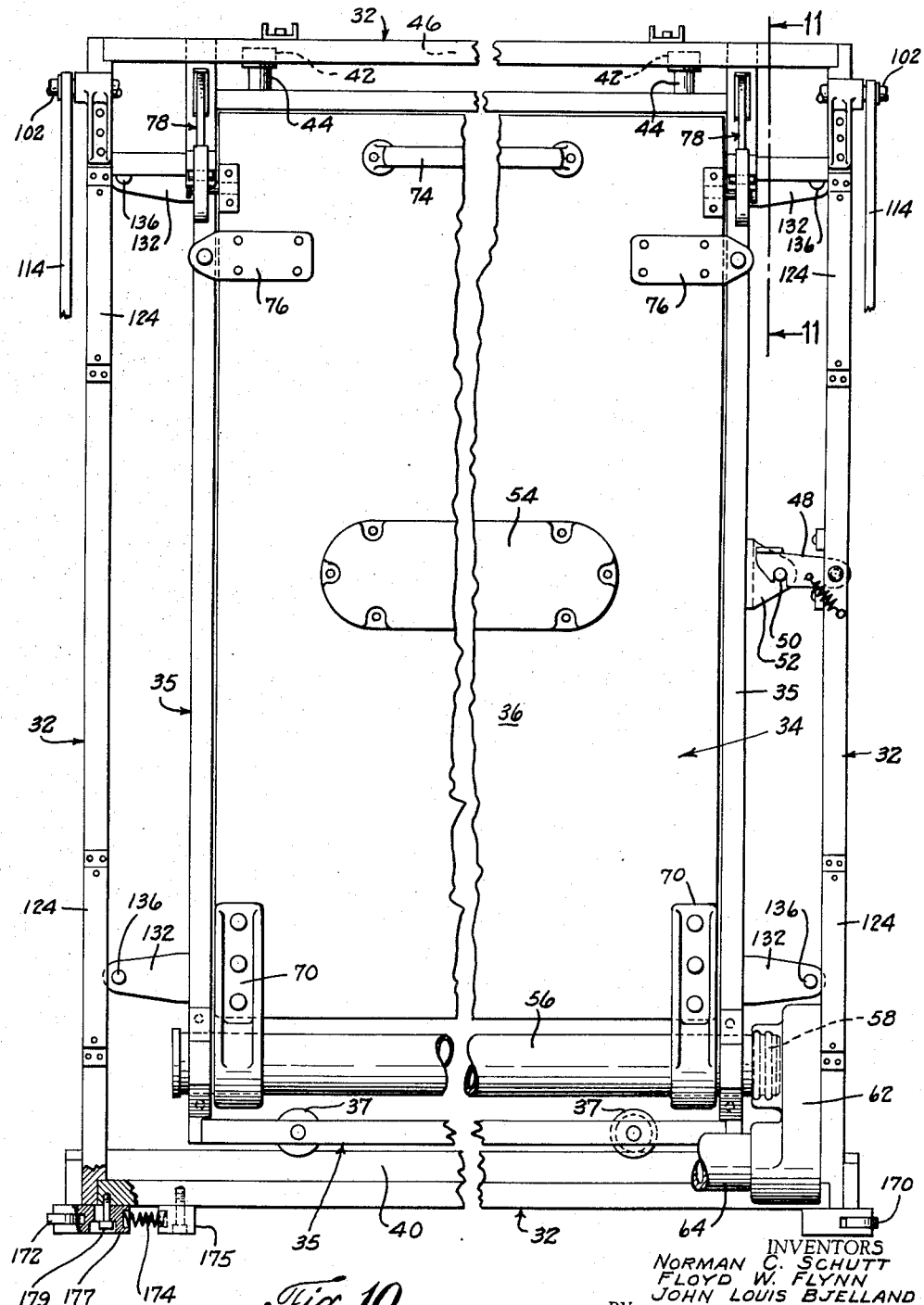

United States Patent Office 2,939,371
Patented June 7, 1960

2,939,371

PHOTOMECHANICAL CAMERA

Norman C. Schutt and Floyd W. Flynn, Glen Cove, and John L. Bjelland, Huntington, N.Y., assignors to Powers Chemco, Inc., Glen Cove, N.Y., a corporation of New York Filed Dec. 11, 1957, Ser. No. 702,144

10 Claims. (Cl. 95—19)

The present invention relates to a novel and improved camera especially adapted for use in the photomechanical processes and which is especially adapted to the use of various photosensitive materials, such as sensitized glass plates, sheet film and sheets of film cut from rolls.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate one embodiment of the invention, and together with the description, serve to explain the principles of the invention.

Of the drawings:

Figure 1 is a fragmentary side elevation, with certain portions broken away, showing those portions of the camera which are particularly related to the present invention;

Figure 2 is a rear elevation, with other parts broken away of the embodiment shown in Figure 1;

Figure 3 is a fragmentary detailed side elevation of the mechanism for movably supporting the film and plate holders, with parts broken away;

Figure 4 is a vertical section taken on the line 4—4 of Figure 3;

Figure 5 is a horizontal section taken on the line 5—5 of Figure 3;

Figure 6 is a fragmentary detail side elevation of a portion of the mechanism by which the film and plate supports are moved toward and from the camera lens;

Figure 7 is a vertical section taken on the line 7—7 of Figure 6;

Figure 8 is a detailed rear elevation, with parts broken away and showing the suction connection to the film support and the pivotal mounting of the support;

Figure 9 is a sectional view on the line 9—9 of Figure 8;

Figure 10 is a fragmentary rear elevation, with parts broken away, of the film support and its mounting means;

Figure 11:
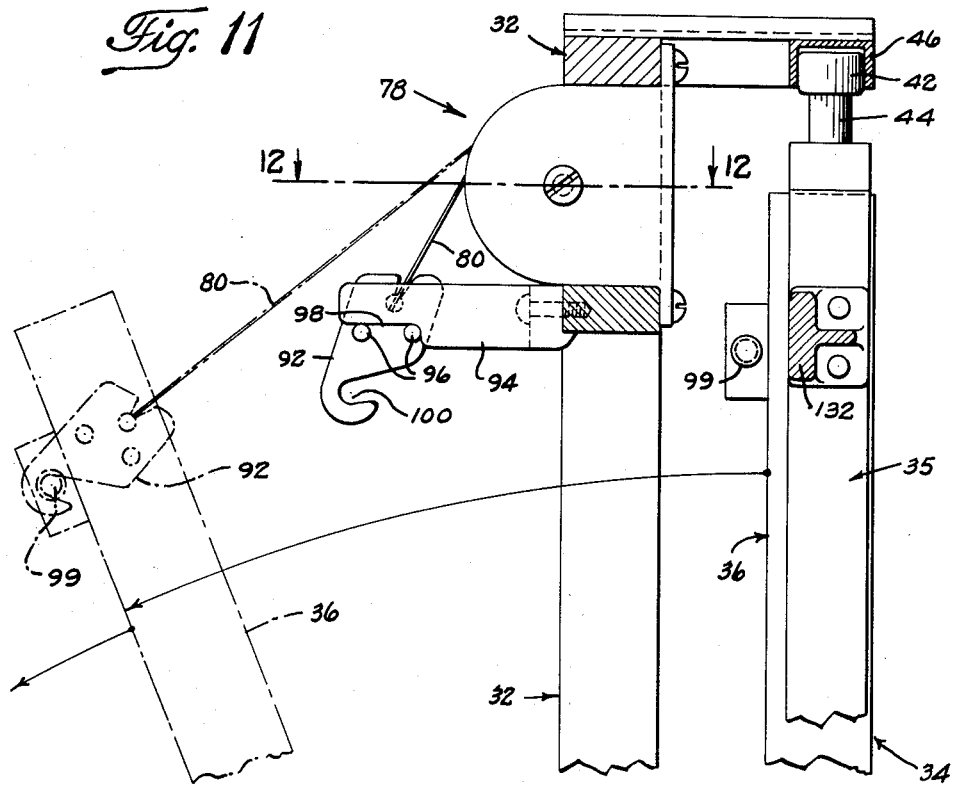
Figure 11 is a sectional view taken on the line 11—11 of Figure 10.

The present invention has for its object the provision of a novel and improved photomechanical camera adapted for use either with suction-held sheet film cut from roll film or with sensitized glass plates. A further object is the provision of a novel and improved camera which includes several different selectively useable holders for sensitized material which may be moved one at a time into exposure position and which are accurately located in the focal plane for exposure. Still another object is the provision of a camera which is adapted to be operated alternatively with suction-held sheets of film cut from a roll of film, and which may be fed successively to the film support in exposure position or which may be positioned to receive and hold a sheet of cut film. The invention thus provides a photomechanical camera of great flexibility which is capable of the highest degree of excellence in its work.

The photomechanical camera of the present invention generally includes a lens, bellows, and a disappearing halftone screen whereby one or another of a plurality of halftone screens may be moved into exposure position with the present invention being primarily concerned with the portion of the camera located rearward of or behind this screen and especially with the facility at the rear of the camera for holding in place for exposure whatever sensitive material is to be used as well as for storing other sensitized material and providing for the interchange of the various sensitized materials. The present invention provides for supporting alternatively in the focal plane of the camera or in a storage compartment to one side of the exposure area, a suction board to receive and hold sheet film, or sheets of film cut from roll film, or a plate kit which may support a photographic plate or a focusing sheet of ground glass. Preferably, the suction board is adapted for lateral movement into and out of the exposure area, is detachably connected to the source of suction so that suction is applied only when it is in exposure position, and is also adapted to be swung pivotally rearwardly of the camera while in the exposure area so that it may be easily loaded with sheet film, or it may receive film cut from a roll while it is in its normal vertical position. When moved laterally, the suction support is moved into a storage compartment which may also contain the stored ground glass kit and the glass plate holder any of which may be moved one at a time into the exposure area. Means are also provided for resiliently moving the selected holder in exposure position toward and from the lens to bring the sensitized surface accurately into the focal plane of the camera and thereafter to return the holder to a position from which it may be returned to its storage position, and other means are provided forming locating members which may be adjusted to vary the position of the sensitized material and accurately locate it in the focal plane.

It will be understood that the foregoing general description and the following detailed description as well are exemplary and explanatory of the invention but are not restrictive thereof.

Referring now in detail to the present preferred and illustrative embodiment of the invention shown in the accompanying drawings; the invention is shown as adapted for use in a relatively large camera of the type generally corresponding to those used for halftone photomechanical reproduction, and of the type shown in the prior patent to Frank T. Powers No. 2,287,271 of 1942.

The camera comprises a conventional lens 10 mounted in a suitable shutter on a lens board 12 at the forward end of a bellows 14, the lens board being supported for horizontal movement along the rails 16 toward and from a halftone screen (not shown), and a support for the sensitized material, the halftone screen lying slightly in front of the sensitized material and both being parallel to the focal plane of the lens 10.

The bellows 14 are attached to the back 18 of the camera which is a light-tight sheet metal box or housing 142 containing the screens and sensitized material support, and which, at its rear end is preferably provided with light-tight doors 20 which open into the darkroom, and provide access to the rear of the camera. Many auxiliary parts of the camera are omitted from the showing of the present application as they are unnecessary to a full understanding of the present invention and as many different forms of such parts may be used, as desired.

Means are provided for moving the halftone screen, positioned between the lens 10 and the sensitized material, toward and from the lens 10 while retaining its vertical position parallel to the focal plane, and this screen movement is actuated and controlled by lever 22 mounted exteriorly of the camera back 18 and above the screen mechanism.

Also positioned above the exposure area of the camera 10 and preferably forming an upper part of the camera back 18 is a film supply 24 which is adapted to support one or more rolls of film from which selected lengths of the desired grade of photographic film may be fed and cut, thereby supplying a sheet of film to an exposure position between the screen and the film support, the film conveniently being fed downwardly from a supply roll 26 by means of the feed rollers 28 which may be actuated by the manual crank 30. One such suitable film feeding means is shown in the prior patent to Andrew K. Anander No. 2,741,963 of 1956.

Immediately to the rear of the screen and within the back 18 of the camera is positioned a mounting frame 32 which has mounted upon it a support or carrier for a sensitized material with the mounting frame being movable parallel with the optical axis of the camera to and from a forward position where the sensitized material is in the focal plane and a rearward operating position where the sensitized material carrier may be removed from the mounting frame in a lateral direction and a carrier of another and different sensitized material moved into the mounting frame 32.

In the organization shown in the drawings a suction type film support 34 is shown positioned in mounting frame 32. This film support includes frame 35 which extends around the perimeter of the support and within which is mounted the hollow body portion 36 with the front thereof having a flat film receiving surface which is provided with preforations through which suction is applied for retaining the film against this surface. Mounted on the lower extremity of support frame 35 are the pair of horizontally spaced, recessed or flanged, rollers 37 with these rollers being received upon the upper end of the track 40 which is positioned at the lower end of mounting frame 32 and forms part of this frame. The upper end of support frame 35 is retained in position by means of the pair of horizontally spaced rollers 42 which are mounted on the upper end of the vertical shafts 44 and which are received between the downwardly extending flanges of channel member 46 which is mounted on the upper end and also forms a part of the mounting frame. By mounting the film support 34 in mounting frame 32 in this manner the support may readily be moved laterally from the mounting frame to a storage area located at the side of the frame and another and different support moved onto the mounting frame.

In order to releasably retain support member 34 in its proper lateral position on the mounting frame there is provided on the frame a releasable latch 48 which has a recess that receives pin 50 mounted on ear 52 extending from the frame 35 of the film support. Latch 48 is spring biased to its latching position, shown in Figure 10, and is manually released from this latching position.

Suction is applied to film support 34 through the distribution manifold 54 located at the rear of the film support and which communicates with conduit 56 that is journaled to frame 35 of the film support. The left end of this conduit 56 as shown in Figures 2 and 10 is capped while the right end is open and provided with a pair of axially spaced toroidal seals 58 (Figure 8). This open end of conduit 56 provided with the seals is received within opening 60 in U-shaped receptacle 62 when the film support is properly positioned on the mounting frame, with the receptacle being secured to the mounting frame. Extending from the other end of this receptacle is conduit 64 which communicates with a suitable source of vacuum and has a flexible portion so as to accommodate the previously mentioned movement of the mounting frame. The reception of the end of conduit 56 within receptacle 62 forms a readily detachable fluid-tight connection through which a vacuum may be supplied to the film support with this connection permitting the film support to be easily moved along rail 40 laterally of mounting frame 32 to and from its operative position in the frame. The application of vacuum to the film support through conduit 64 may be controlled as desired by a control device, not shown, in the connection with the source.

In order that cut film may be positioned on the face 66 of film support 34, as for example the sheet of film 68 shown in Figure 1, the body portion 36 of the film support is secured to conduit 56 by means of brackets 70 and since conduit 56 is journaled to the frame 35 of the film support body portion 36 may be pivoted rearwardly about the axis of conduit 56 to a position where cut film may be readily positioned on its face. Body portion 36 of the vacuum type film support is normally retained in its operative or vertical position by means of bolt type latch 72. When in its latching position the extremity of latch 72 is received within a suitable recess in frame 35 of the film support, with the latch being released in a conventional manner for pivoting body portion 36 of the film support to a loading position for sheet film and with handles 74 being provided for manipulation of the body portion. Stops 76 are secured to body portion 36 and extend laterally therefrom, as shown, for engagement with frame 35 to limit the upward pivotal movement of the body portion so that it will not be pivoted beyond its upright operating position.

Figure 12:
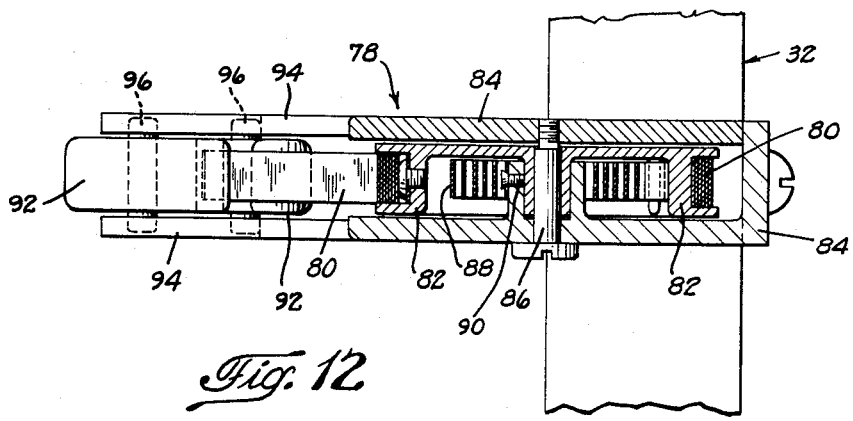
Figure 12 is a detail sectional view taken on the line 12—12 of Figure 11.

A counterbalance for body portion 36 of the film support is provided through a pair of counterbalance devices 78 which are carried by mounting frame 32 near its upper end (Figures 10 and 11), and which are mounted on each side of the body portion. These counterbalance devices, one of which is shown in detail in Figures 11 and 12, comprise a flexible band 80 that is wound on reel 82. This reel is mounted in housing 84 secured to frame 32 and rotates about the shank of cap screw 86. Within reel 82 is spiral spring 88 which has one end secured to the housing 84 by means of screw 90 and the other end secured to the outer portion of the reel with this spring being effective to bias the reel to a position where the flexible band is wound on the reel to its full extent. Secured to the outer end of band 80 is hook member 92 which is normally retained in the position shown in full lines in Figure 11 by means of the bifurcated bracket 94 between the fingers of which hook member 92 is received with the hook member being provided with stop pins 96 that extend through the member and on each side thereof and are received within and engage the recessed portion 98 at the lower edge and outer end of the bifurcate. When bolt 72 is unlatched and body portion 36 of the film support is pivoted rearwardly, the pins 99 which extend laterally from each side of the body portion are received within recesses 100 of the two hook members 92 after the body portion has pivoted only a short distance from its upright position within frame 35 so that further pivotal movement of the body portion unreels the flexible bands 80 of the two counterbalancing devices against the bias of springs 88 whereby a majority of the weight of the body portion is supported by these counterbalancing devices. Upon return of the body portion to its upright operative position hook members 92 are returned to their solid line position shown in Figure 11 and pins 99 are disengaged from the hook members. The engagement of hook member 92 with pin 99 of body portion 36 is shown in dotted lines in Figure 11.

As positioned within mounting frame 32, film support 34 including conduit 64 is in parallel relation with the focal plane of the camera so that film sheet 68 may be positioned within the focal plane.

The entire mounting frame 32 is movable to and from a forward or exposure position and a rearward operating position by means of a lever and cam operating system with this system also being effective to support the mounting frame so as to permit this forward and rearward movement. As embodied, this system includes the operating shaft 102 which is journaled to the stationary frame 104 of the camera. There are two identical systems of levers and cams, one of which is located on each side of the mounting frame 32 with one of the systems being shown in Figure 1. Each of these systems includes link 106 which is journaled at one end to shaft 102 and is pivotally connected with link 108 at its other end. This latter link is pivoted at its upper end to bracket 110 which extends rearwardly from mounting frame 32 and is bifurcated at its lower end with stub shaft 112 being received between the fingers of the bifurcate. This linkage 106 and 108 is operative to support mounting frame 32 in a manner which permits the frame to move forward and backward along the optical axis of the camera and is constructed so that this movement of the mounting frame is substantially rectilinear.

The forward and rearward movement of the mounting frame 32 is effected by means of a pair of vertically spaced pivotal arms or cams 114 and 116 which form a part of each of the lever and cam systems. Arm 114 is secured to shaft 102 for rotation with this shaft while arm 116 is secured to stub shaft 112 with this shaft being journaled to bracket 117 which is in turn secured to the stationary frame 104 of the camera. The vertically spaced pivotal arms 114 and 116 are interconnected by link 118 so that they move simultaneously and the forward end of each of these arms is provided with a laterally extending pin 120 which is received between a spring biased lever 122 and a member 124 forming a part of frame 32, in order that movement of the pivotal arms will move the mounting frame while limited relative movement between the frame and arms may be had for a purpose later described. As shown in Figure 9, lever 122 and member 124 are mounted on the rear of mounting frame 32 by means of brackets 126 and 127 with the lever being pivoted to bracket 126 and with member 124 extending between and being secured to these brackets. Lever 122 may be pivoted forwardly a limited distance toward mounting frame 32 with the rearward or outward pivotal movement of the lever being limited by shoulder 130 on bracket 127 and with spring 131 urging the lever to its outward pivotal limit.

Rotation of shaft 102 accordingly, simultaneously pivots the arms 114 and 116 and by rotating shaft 102 so that these arms are pivoted in a counterclockwise direction as viewed in Figure 1 mounting frame 32 will be moved to its forwardmost position where film sheet 68 is located in the focal plane of the camera while rotation of shaft 102 in the opposite direction will move mounting frame 32 to its rearmost operative position.

The forwardmost position of mounting frame 32 is determined by the four stops 132 that extend laterally from frame 35 of film support 34, as shown in Figure 1, and which engage similar stops 134 that extend laterally from stationary frame 104 of the camera. The stops 132 are provided with adjustable set screws 136 which provide an adjustable abutment with stops 134 thereby providing for accurate adjustment of the film support and accordingly mounting frame 32 axially of the camera so that the sensitized material carried by support 34 may be located precisely in the camera's focal plane. Each of the pivotal levers 122 which are engaged by pins 120 for movement of frame 32 into its forwardmost position, provide a yieldable connection or linkage in this motion transmitting system which permits limited adjustment of mounting frame 32 and film support 34 by set screws 136 for accurate positioning of the film sheet in the focal plane. Shaft 102, from which the two linkage systems located on each side of the mounting frame are operated, is rotated by handle 138 or 140, both of which handles are fastened to the shaft with handle 138 being mounted outside of the light-tight housing 142 while handle 140 is located within the housing.

In order that mounting frame 32 will be retained in its forwardmost operating or exposure position after being moved thereinto from its rearmost operating position there is associated with shaft 102 a latching device, spring biased to its latching position and effective when latched to retain the mounting frame in its forward position. This latching mechanism, which is shown in detail in Figures 6 and 7, includes a laterally extending pie shaped member 144 which is keyed to shaft 102. The lower extremity of the periphery of member 144 is provided with notch 146 for receiving the upper end of latch 148 which is pivoted about its lower end at 150. This latch is operated by means of lever 152 which is pivotally connected to camera frame 104 at 154 and is connected with latch 148 by link 156, with there being a lost motion connection between this link and latch 148. Pivotally connected to the lower end of lever 152 at 158 is operating bar 160 which is slidably retained against the camera frame 104 by screws 162 in a manner which permits the operating bar to move longitudinally and accordingly pivot lever 152 about its pivotal axis at 154. Latch 148 is biased to its latching position by means of compression spring 164 which extends from link 152 and is received in a recess in the latch. Thus when shaft 102 is rotated by handle 138 or 140 to its position where mounting frame 32 is moved forward and the sensitized material is in the focal plane of the camera latch 148 moves to its latching position under the bias of spring 164. In order to release latch 148, bar 160 is moved to the left as viewed in Figure 6 with latch 148 then being moved radially outward from notch 146. Operating bar 160 may be actuated either from within light-tight housing 142 or exteriorly of this housing with operating knob 165 extending from the bar to the exterior of the housing through a slot provided in the housing and with operating knob 166 being secured to the bar for manipulation within the housing.

The lower end of mounting frame 32 is retained in its correct lateral position and is laterally guided during its forward and rearward movement between its extreme operating positions by means of a pair of horizontally disposed guide rollers that are carried by the frame, with roller 170, which is fixed with relation to the mounting frame, engaging a portion of the camera frame 104 at one side of the mounting frame and with spring pressed roller 172 being urged laterally into engagement with camera frame 104 at the other side of the mounting frame. The bias for roller 172 is provided by spring 174 which is positioned between the stationary block 175 and the laterally movable roller mounting 177 mounted on frame 32 by cap screw 179 that is received in an elongated opening in mounting 178.

In lieu of employing film as the sensitized material in the camera other sensitized materials may be employed, such as sensitized glass, and in order to change from film operation to operation with other sensitized materials the mounting frame is organized so that the film support may be readily removed and a support for a different sensitized material or for a focusing sheet of ground glass may be inserted into the mounting frame. The storage area for these additional supports or holders is located laterally of the mounting frame and the supports or holders are moved laterally to and from the mounting frame, with the storage area, in the view of Figure 2, being located to the left of the support frame and exposure area and being shown containing two support members 176 and 178, one of which may be a support for a sensitized glass plate and the other of which may be a support for a focusing sheet of ground glass, although it is to be understood that this is merely exemplary of a variety of image receiving means that may be employed with the invention. The frames for support members 176 and 178 are similar to frames 35 of the film support and are provided with recessed rollers 37 at their lower ends and guide rollers 42 at their upper ends and with laterally extending stops 132 and latch pin 50. In the storage area there is provided a separate track or rail and a separate channel located vertically above the track for each support member that is to be stored in the area with the device being adapted for use with as many support members as desired. In the illustrative embodiment there are three such pairs of rails and channels, one for each of the three support members, with track 180 and channel 182 (Figures 3, 4 and 5) being for film support 34 while track 184 and channel 186 are for support member 176 and track 188 and channel 190 are for support member 178.

Mechanism is provided in the storage area for simultaneously moving these tracks and channels in a direction parallel with the optical axis of the camera so that the desired track and channel may be properly positioned laterally of the mounting frame for transferring a support to or from the mounting frame. The mechanism for effecting this movement includes a lower pair of horizontally spaced rods 192 and an upper pair of horizontally spaced rods 194 with these two pairs of rods being parallel with the optical axis of the camera and being mounted in brackets 196 which are secured to and supported on camera frame 104. The channels 182, 186 and 190 are secured to and extend between the pair of carrier members 198, with one of these carrier members being slidably mounted on each of the pair of upper rods 194. The rails 180, 184 and 188 extend between and are mounted on the similar pair of carrier members 200, one of which is slidably mounted on each of the lower pair of rods 192. Carrier members 198 and 200 are provided with rack portions 202, each of which is engaged by a suitable pinion 203 with the pinions that engaged the rack portions of the pair of carrier members 200 being secured to shaft 204 and the pinions that engaged the racks mounted on the pair of carrier members 198 being secured to shaft 206, both of which shafts are journaled to brackets 196, as shown in Figure 4, with a boss being provided on the brackets for this purpose. Shaft 204 is rotated by hand wheel 208 through chain 210 which extends between and is positioned over sprockets 212 and 214 with the latter being secured to shaft 204 and the former to the shaft of hand wheel 208. Shaft 206 is rotated simultaneously with shaft 204 and to the same extent by means of chain 216 which extends between a pair of similar sprockets 218 secured to these respective shafts. Through this arrangement, rotation of hand wheel 208 moves the two pair of carrier members 198 and 200 along their respective rods in the same direction and the same amount. The rails 180, 184 and 188 are at the same elevation as rail 40 of the mounting frame and channels 182, 186 and 190 are at the same elevation as channel 46 of the mounting frame. When the mounting frame is in its rearmost position the rail 40 and channel 46 of the mounting frame are opposite transition rail 220 and transition channel 222 respectively which are fixed to the frame of the camera. Through manipulating hand wheel 208 the desired rail and channel in the storage area is also aligned with the transition rail and channel and then a support member may be transferred to or from the mounting frame, with movement of the supporting member being effected by manually grasping the member and moving it laterally along the rail. Indexing of rails 180, 184 and 188 with transition rail 220 is facilitated by the spring pressed detent 223 (Figure 4) mounted on rail 220 and engaging bar 225 which extends laterally beneath rails 180, 184 and 186 and which is provided with a recess 227 beneath each rail for receipt of the detent.

In the illustrative organization, if support member 176 carries a focusing sheet or plate of ground glass and support member 178 carries a sensitized glass plate and, if it is desired to remove the suction type film support 34 from mounting frame 32, focus the camera by means of the ground glass and then position the sensitized glass plate in its proper position for exposure, rail 180 in the storage area and its corresponding channel 182 are first moved by means of hand wheel 108 to the position where they are in alignment with the transition rail 220 and the transition channel 222, respectively. Mounting frame 32 is moved to its rearmost position where its rail and channel are also in alignment with the transition rail and channel and then the film support is manually moved laterally into the storage area on track 180 and into channel 182. Hand wheel 208 is then operated so that support member 176 carrying the ground glass focusing plate is in position for transfer to the mounting frame with rail 184 and channel 186 being brought into alignment with the transition rail and channel. Support member 176 is then moved laterally into the mounting frame with the mounting frame being moved forward, latched in its forwardmost position and with the camera adjusted so as to obtain the proper focus. Thereafter mounting frame 32 is moved to its rearmost position support member 176 moved laterally from the mounting frame into the storage area and support member 178, which carries the sensitized glass, moved by hand wheel 208 to the position for transfer to the mounting frame and where rail 188 and channel 190 are aligned with the transition rail and channel. The support member 178 is then moved laterally into mounting frame 32 and the frame moved forward into exposure position.

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a photomechanical camera, the combination of a hollow shaft extending parallel to the focal plane of the camera, a support frame having the shaft journaled thereto, said frame being movable together with the shaft to and from the camera exposure area, a fixed source of suction detachably engageable with one end of the shaft when it is moved into said exposure area to apply suction thereto while permitting rotation of the shaft about its axis, and a flat film supporting member for retaining film on one of its faces by suction applied through said fixed source and shaft, said film supporting member being secured to and communicating with the interior of said hollow shaft with the rotatable shaft forming a pivotal mounting for the film support for movement thereof into and out of the focal plane of the camera.

2. A photomechanical camera including in combination a film supporting member pivotally mounted about an axis parallel to the focal plane for movement toward and from the focal plane, means for moving the film supporting member normal to the focal plane, variably positionable stops operative to limit the forward movement of the film supporting member to locate it in the focal plane, said film support moving means including a resilient connection urging the film support means against the stops and providing for relative movement of the film support with respect to the moving means whereby the forward face of the film support means may be accurately located in the focal plane by said stops a second support member for a sensitized element is provided, said film supporting member and said second member being movable alternatively into and out of exposure position by movement parallel to the focal plane of the camera, a mounting frame receiving the film support and the second support member when in the exposure position, said frame being moved normal to the focal plane of the camera by the movable means, and adjustable means for limiting forward movement of the second support member whereby a sensitized element supported by said second member may also be accurately brought into the focal plane of the camera.

3. A photomechanical camera comprising a plurality of support members for image receiving means and including a vacuum film support, a mounting frame in the exposure area adapted to receive said support members one at a time, a storage facility laterally of the exposed area, means by which the support members can be selectively laterally transferred to and from the mounting frame and storage facility, said vacuum film support including a frame, a conduit adjacent the lower end of the frame and journaled to the frame, said conduit extending in the direction of movement of the film support to and from the mounting frame with the forward end of the conduit as the film support is moved into the mounting frame being open and the other end being closed, a receptacle on the mounting frame receiving said forward end of the conduit to connect the conduit to a source of vacuum when the film support is moved into position in the mounting frame, a hollow means presenting a normally vertical surface against which film is held by suction, said hollow means being secured to and communicating with the interior of the conduit whereby said hollow means is connected to a source of vacuum through the said conduit and the conduit provides a pivotal support therefor.

4. The organization of claim 3 including a counterbalance means on the mounting frame, said counterbalance means normally being free of the hollow means but engaging the same after it is pivoted a predetermined amount from its vertical position to counterbalance the weight thereof.

5. A photomechanical camera comprising a mounting frame in the exposure area of the camera, a plurality of support frames for various image receiving members, a storage facility for the support frames, means for moving the support frames one at a time to and from the mounting frame, said mounting frame being movable normal to the focal plane of the camera between a forward exposure position and a rearward position for transfer of support frames, means for effecting this movement of the mounting frame including a motion transmission system, said system having a yieldable spring connection effective to resiliently urge the mounting frame to its forward position and providing limited relative movement between the mounting frame and the means for moving the same permitting accurate adjustment of the image receiving means to the focal plane of the camera, means for limiting the forward movement of the mounting frame to position the image receiving means in said focal plane including coacting sets of members on the support frames and on a stationary part of the camera with one set having an adjustable portion.

6. The organization of claim 5 wherein the means for moving the mounting frame includes two pairs of vertically spaced levers, one pair adjacent each side of the frame, means for simultaneously pivoting the levers, and said spring connection being interposed between the levers and the mounting frame.

7. The organization of claim 5 including a latch means connected with the means for moving the mounting frame and operative to releasably retain the latter means in the position where the mounting frame is resiliently held in its forward position.

8. The organization of claim 7 wherein the mounting frame is disposed in a housing that defines the exposure area with there being means accessible exteriorly and interiorly of the housing to operate the means for moving the mounting frame and to operate the latch means.

9. In a photomechanical camera, a mounting frame in the exposure area thereof adapted to releasably receive various support frames for image receiving means, said mounting frame being movable between a forward exposure position and a rearward position for interchange of support frames, a lever arrangement adjacent each side of the mounting frame operative to support the same for such movement and arranged to provide generally rectilinear motion for the mounting frame generally parallel with the focal plane of the camera, means for effecting such movement of the mounting frame including a pair of vertically spaced levers adjacent each side of the mounting frame, means providing a resilient interconnection between these latter levers and the mounting frame operative to allow limited relative movement therebetween and provide a bias for the mounting frame when in its forward position.

10. A photomechanical camera comprising a mounting frame in the exposure area thereof, a plurality of support frames for various image receiving members and including a vacuum film support having a hollow portion that is provided with a film receiving surface, a storage facility for the support frames adjacent to and laterally of the exposure area, means by which the support frames may be moved generally horizontally one at a time to and from the mounting frame, said mounting frame being movable between a forward exposure position and a rearward position for interchange of support frames, a lever arrangement adjacent each side of the mounting frame operative to support the same for such movement and arranged to provide generally rectilinear motion for the mounting frame generally parallel with the focal plane of the camera, means for effecting such movement of the mounting frame including a pair of vertically spaced levers adjacent each side of the mounting frame, means providing a resilient interconnection between these levers and the mounting frame operative to allow limited relative movement therebetween and provide a bias for the mounting frame when in its forward position, means adjustably regulating said forward position including a plurality of adjustable abutment disposed about each support frame and cooperating abutments in the exposure area of the camera, means for connecting the vacuum film support to a source of action upon moving the support into the mounting frame including a receptacle on the mounting frame, a hollow horizontal conduit having an open end releasably received in the receptacle, said hollow conduit being journaled to the frame of the film support and the hollow portion of the film support being mounted on and communicating with the interior of the conduit whereby the conduit provides a pivotal support for said portion and establishes a connection therefore with a source of vacuum.

References Cited in the file of this patent
UNITED STATES PATENTS

| | | |
|---|---|---|
| 2,376,416 | Campbell | May 22, 1945 |
| 2,643,187 | Linzell | June 23, 1953 |
| 2,730,939 | Blatherwick | Jan. 17, 1956 |